United States Patent [19]

Kawaguchi et al.

[11] Patent Number: 5,024,464
[45] Date of Patent: Jun. 18, 1991

[54] VIBRATION SUPPRESSION APPARATUS FOR STEERING WHEEL WITH AIR BAG

[75] Inventors: Masaaki Kawaguchi; Tomio Okamuro; Keiichi Shirose, all of Utsunomiya, Japan

[73] Assignee: Honda Giken Kogyo Kabushiki Kaisha, Tokyo, Japan

[21] Appl. No.: 388,873

[22] Filed: Aug. 3, 1989

[30] Foreign Application Priority Data

Aug. 8, 1988 [JP] Japan .................. 63-104032[U]

[51] Int. Cl.⁵ .............................................. B60R 21/16
[52] U.S. Cl. .................................... 280/731; 280/736; 280/741
[58] Field of Search .................. 280/731, 736, 741

[56] References Cited

U.S. PATENT DOCUMENTS

| | | | |
|---|---|---|---|
| 3,708,181 | 1/1973 | Mazelsky | 280/730 |
| 3,787,075 | 1/1974 | Francis | 280/731 |
| 3,944,251 | 3/1976 | Lynch | 280/731 |
| 4,785,144 | 11/1988 | Fosnaugh et al. | 280/731 |

FOREIGN PATENT DOCUMENTS

| | | | |
|---|---|---|---|
| 2248925 | 4/1974 | Fed. Rep. of Germany | 280/731 |
| 3710173 | 10/1988 | Fed. Rep. of Germany | . |
| 1531069 | 11/1978 | United Kingdom | . |

*Primary Examiner*—Kenneth R. Rice
*Attorney, Agent, or Firm*—Armstrong, Nikaido, Marmelstein, Kubovcik, & Murray

[57] ABSTRACT

A vibration suppression apparatus for a steering wheel having an air bag unit attached to the steering wheel body. The air bag unit includes a gas generator and a bag. At least part of the air bag unit is attached to the steering wheel body through a resilient means and thus, functions as a damper wieght, thus enabling the vibration of the steering wheel to be suppressed by the dynamic damper effect.

4 Claims, 3 Drawing Sheets

VIBRATION SUPPRESSION APPARATUS FOR STEERING WHEEL WITH AIR BAG

BACKGROUND OF THE INVENTION

The present invention relates to a vibration suppression apparatus for a steering wheel equipped with an air bag unit.

A vehicle having an air bag unit comprising a bag and a gas generator incorporated in its steering wheel has heretofore been commercially available.

When an air bag unit is incorporated into a steering wheel, the steering wheel becomes somewhat heavy. In some cases, the resonance frequency of the steering system coincides with the engine vibration at the time of idling of the engine. Therefore, it is desired to take measures to prevent or suppress such vibration.

In view of such a demand, it is an object of the present invention to provide an apparatus designed so as to be able to suppress the vibration of the steering wheel by the use of the air bag unit itself.

SUMMARY OF THE INVENTION

To attain the above-described object, the present invention provides a vibration suppression apparatus for a steering wheel having an air bag unit attached to the steering wheel body, the air bag unit including a gas generator and a bag, characterized in that the air bag unit or a part thereof is attached to the steering wheel body through a resilient means.

Since the air bag unit or a part thereof is attached to the steering wheel through a resilient means, the air bag unit or a part thereof functions as a damper weight, thus enabling the vibration of the steering wheel to be suppressed by the dynamic damper effect.

Since no damper weight needs to be provided separately, the external appearance of the steering wheel is not damaged and it is possible to minimize the increase in the cost of the unit as a whole, as a matter of course.

BRIEF DESCRIPTION OF THE DRAWINGS

The above and other objects and the attendant advantages of the present invention will become readily apparent by reference to the following detailed description when considered in conjunction with the accompanying drawings wherein.

Figure 1:
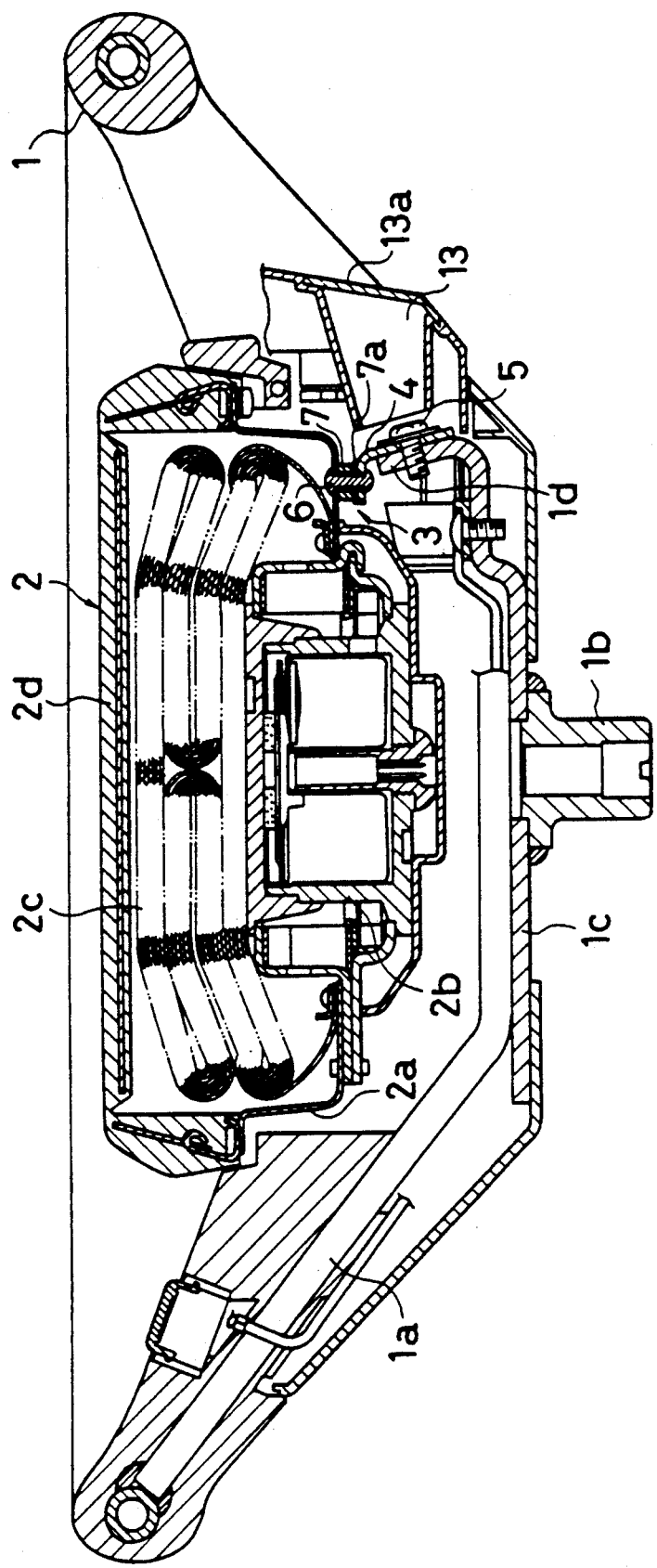
FIG. 1 is a sectional view of a steering wheel showing one embodiment of the present invention.

DETAILED DESCRIPTION OF THE PREFERRED EMBODIMENTS:

Identical parts are shown with same reference numerals throughout the several views of the drawings.

Referring to FIG. 1, a steering wheel body 1 is provided with an air bag unit 2. The air bag unit 2 comprises a casing 2a, a bag 2c accommodated in the casing 2a, and a gas generator 2b rigidly secured within the casing 2a in such a manner that the gas generator 2b is covered with the bag 2c. A cover member 2d which is made of a plastic material is attached to an opening at the upper side of the casing 2a. The air bag unit 2 is attached through a resilient means 3 onto a bracket 1c which connects to each other a spoke portion 1a of the steering wheel body 1 and a boss portion 1b which is fitted on a steering shaft.

More specifically, an inverted L-shaped stay 4 is secured with a bolt 5 to a bent portion 1d which extends upward from the bracket 1c. The casing 2a is attached to the upper end of the stay 4 through the resilient means 3. The resilient means 3 comprises a rivet 6, both ends of which are inserted respectively into the casing 2a and the stay 4, and a tubular resilient member 7 such as a rubber bushing which is fitted over the rivet 6 in such a manner as to leave a clearance therebetween. The upper end of the resilient member 7 is bonded to the casing 2a, while the lower end of the resilient member 7 is seated on the stay 4 through a washer 7a which is bonded to the lower end of the resilient member 7. The rivet 6 is fitted in the washer 7a so that the resilient member 7 will not move horizontally relative to the stay 4, thereby enabling the whole air bag unit 2 to be three-dimensionally resiliently supported by the resilient member 7. The rivet 6 tilts in response to the movement of the casing 2a in the horizontal direction but functions as a stopper to prevent the casing 2a from moving horizontally in excess of a predetermined amount and from moving upward in excess of a predetermined level, thereby preventing the resilient member 7 from being excessively deformed and broken. It should be noted that there are, although not shown, provided plural pairs of the resilient means 3 and the stay 4.

Figure 2:
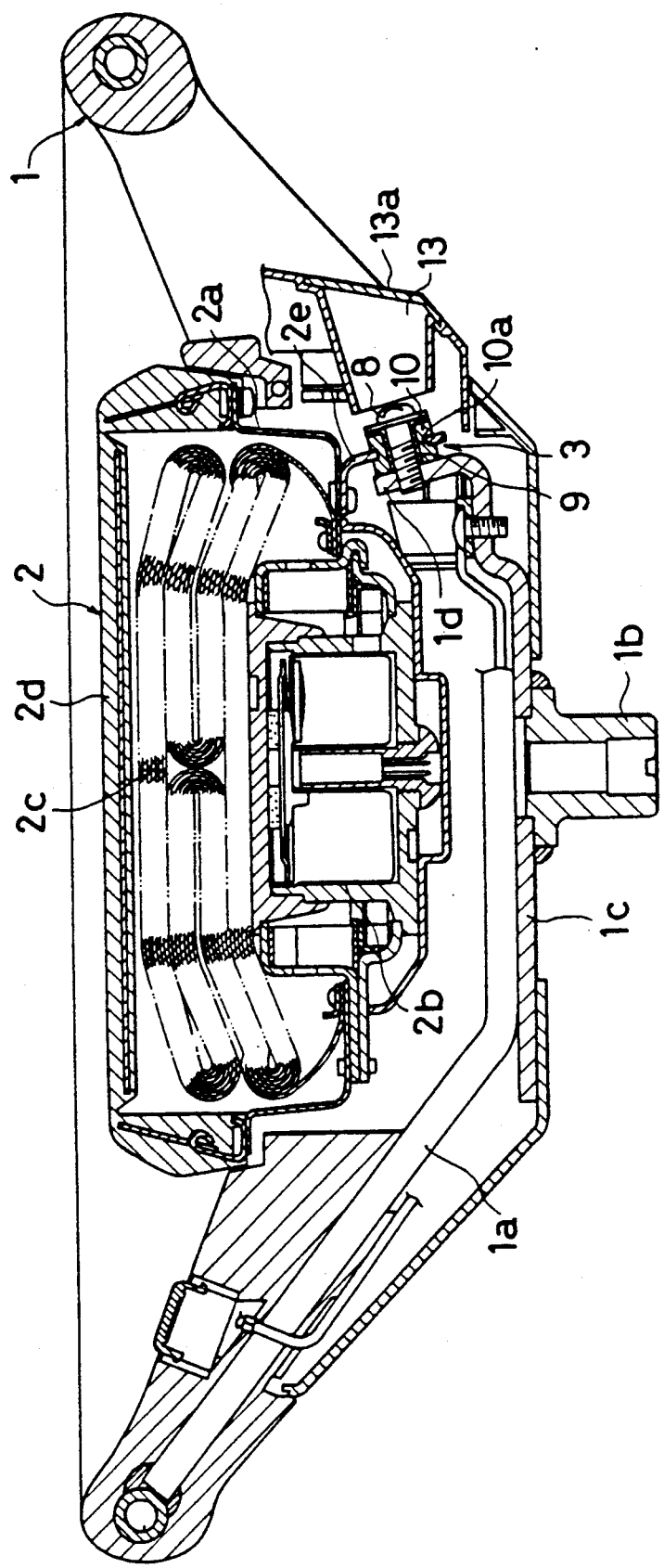
FIG. 2 is a sectional view of a steering wheel showing another embodiment.

In the embodiment shown in FIG. 2, a stay 2e which extends downward is rigidly secured to the casing 2a of the air bag unit 2. The stay 2e is attached to the bent portion 1d through a resilient means 3'. This resilient means 3' comprises a collar 9 which is secured to the bent portion 1d with a bolt 8 and a tubular resilient member 10 which is fitted over the collar 9. The stay 2e is engaged with a groove 10a formed around the outer periphery of the resilient member 10 at a through-hole which is formed in the stay 2e.

Figure 3:
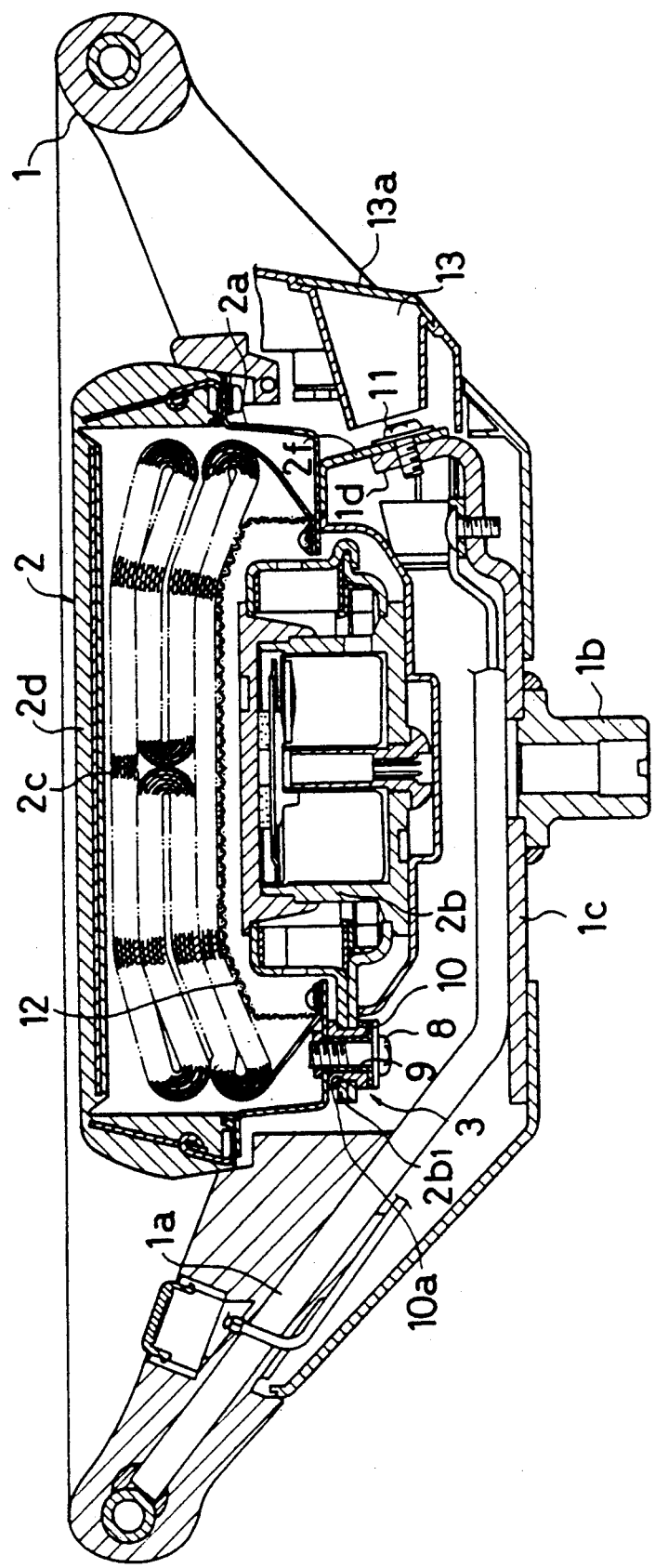
FIG. 3 is a sectional view of a steering wheel showing still another embodiment.

Although, in the foregoing embodiments, the whole air bag unit 2 is attached to the steering wheel body 1 through the resilient means 3, 3', the unit 2 may be resiliently supported through the resilient means 3" only at part thereof, for example, at the gas generator 2b. FIG. 3 shows an embodiment having such an arrangement. In this embodiment, the casing 2a of the air bag unit 2 is secured to the bent portion 1d with a bolt 11 at a stay 2f which is rigidly secured to the casing 2a, while the gas generator 2b is attached to the casing 2a through a resilient means 3". The arrangement of the resilient means 3" is similar to that shown in FIG. 2. More specifically, a collar 9' is secured to the casing 2a with a bolt 8', and a flange portion 2b_1 formed on the outer periphery of the gas generator 2b is engaged with a groove 10a' formed around the outer periphery of the resilient member 10' which is fitted over the collar 9'. In this case, there is a possibility that a movement of the gas generator 2b relative to the casing 2a may cause the gas generator 2b to contact and damage the bag 2c. In this embodiment, therefore, a cover member 12 made of a wire net for supporting the bag 2c is rigidly secured to the casing 2a in such a manner as to cover the gas generator 2b, thereby preventing the bag 2c and the gas generator 2b from coming into contact with each other.

In all of FIGS. 1 to 3, a window 13 is formed in the steering wheel body 1 for tightening the bolt 5, 8 or 11, and a cover 13a is attached to the window 13.

Thus, according to the present invention, an air bag unit or a part thereof is attached to the steering wheel body through a resilient means so that the air bag unit or a part thereof functions as a damper weight. Accordingly, it is possible to effectively suppress the vibration of the steering wheel and it is unnecessary to separately provide a damper weight. Thus, it is possible to minimize the increase in the cost and there is no fear that the external appearance of the steering wheel will be damaged.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vibration suppression apparatus for a steering wheel having an air bag unit attached to the steering wheel body, the air body unit including a gas generator and a bag, characterized in that at least part of said air bag unit is attached to said steering wheel body through a resilient means, wherein a casing for accommodating said bag of said air bag unit is rigidly secured to said steering wheel body, said gas generator being attached to said casing through said resilient means.

2. A vibration supression apparatus for a steering wheel according to claim 1 wherein said casing is provided with a net-like cover member for supporting said bag in such a manner as to prevent said bag and said gas generator from coming into contact with each other.

3. A vibration suppression apparatus for a steering wheel having an air bag unit attached to the steering wheel body, the air bag unit including a gas generator and a bag, characterized in that at least part of said air bag unit is attached to said steering wheel body through a resilient means, wherein said resilient means comprises a fixing member having opposite ends inserted respectively into a member fixed to said steering wheel body and into said at least part of said air bag unit, and a tubular resilient member comprising a rubber bushing which is fitted over said fixing member.

4. A vibration suppression apparatus for a steering wheel having an air bag unit attached to the steering wheel body, the air bag unit including a gas generator and a bag, characterized in that at least part of said air bag unit is attached to said steering wheel body through a resilient means, wherein said resilient means comprises a collar fastened by a fixing member to a member fixed to said steering wheel body and a tubular resilient member comprising a rubber bushing fitted over said collar, said at least part of said air bag unit being engaged with said resilient member.

* * * * *

UNITED STATES PATENT AND TRADEMARK OFFICE
CERTIFICATE OF CORRECTION

PATENT NO. : 5,024,464
DATED : June 18, 1991
INVENTOR(S) : KAWAGUCHI et al

It is certified that error appears in the above-identified patent and that said Letters Patent is hereby corrected as shown below:

Column 3;
Claim 1, line 22, change "body" to --bag--.

Column 4;
Claim 2, line 1, change "supression" to --suppression--.

Signed and Sealed this

Ninth Day of February, 1993

Attest:

STEPHEN G. KUNIN

Attesting Officer

Acting Commissioner of Patents and Trademarks